H. FARMER.
Vegetable Cutter.
No. 34,418. Patented Feb. 18, 1862.
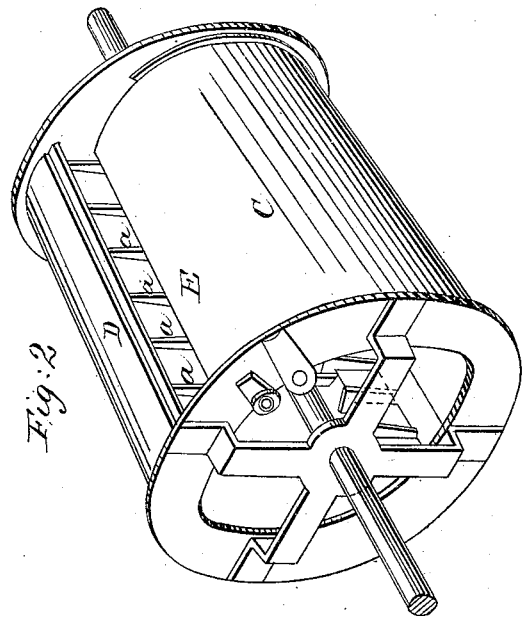
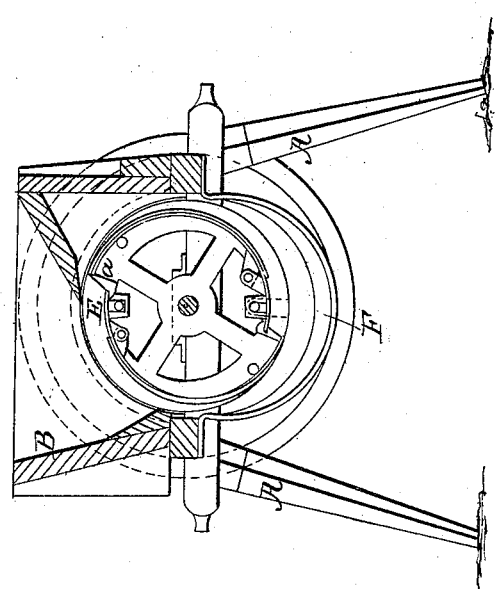
Witnesses.
C. M. Alexander
A. A. Yeatman
Inventor.
H. Farmer

UNITED STATES PATENT OFFICE.

HENRY FARMER, OF PONTIAC, MICHIGAN.

IMPROVEMENT IN VEGETABLE AND ROOT CUTTERS.

Specification forming part of Letters Patent No. 34,418, dated February 18, 1862.

*To all whom it may concern:*

Be it known that I, HENRY FARMER, of Pontiac, in the county of Oakland and State of Michigan, have invented certain new and useful Improvements in Root-Cutters; and I do hereby declare that the following is a full, clear, and exact description of the same, reference being had to the accompanying drawings and to the letters of reference marked thereon.

In the annexed drawings, making part of this specification, A represents a stand or frame which is constructed in a substantial manner and provided upon top with a hopper-box, which is hinged to it.

Lying horizontally upon the frame is a cylinder C, which is firmly secured to an axle, said axle having its bearings upon or in the sides of the frame. The particular construction of the cylinder is represented in Figure 2. The cylinder has two heads, and its periphery is made of sheet metal. In this case two pieces of metal are used for forming the periphery. One end of each of these pieces is secured between and near the rims or peripheries of the heads, and as the said pieces pass around they drop in gradually toward the axle until their other ends stand below and a little distance short of the outer ends of each. An adjustable section E fills out the balance of the periphery from the ends of the pieces, as is shown in Fig. 2. These sections are hinged and secured by a rod which passes through holes in the head provided with nuts and screws. On the under side of the sections are loops or staples through which a rod passes, in order to stay the front end or side of the section and to allow of an adjustability.

a a a represent knives, which are secured to the sections at short intervals, as seen in Fig. 2.

D represents a knife secured upon each of the outer ends of the pieces composing the periphery, and held in place by means of a set-screw. The form of the cylinder is tapering, as seen in Fig. 2.

Beneath the cylinder is a concave spout F, into which the pieces of vegetables fall after being cut by the knives.

A balance-wheel is secured upon the axle of the cylinder.

When vegetables are to be cut, they are thrown into the hopper B and the cylinder is revolved. The knives passing around cut and properly prepare them.

Having thus fully described my invention, what I claim is—

1. The use of the cylinder C, constructed in the manner and for the purpose herein set forth.

2. The employment of the sections E, hinged and provided with knives a a, as and for the purpose herein specified.

In witness that I claim the foregoing I have hereunto set my hand in the presence of two witnesses.

HENRY FARMER.

Witnesses:
T. A. FLOWER,
JAMES CARHARTT.